United States Patent
Oda

(10) Patent No.: US 9,294,749 B2
(45) Date of Patent: Mar. 22, 2016

(54) PROJECTION APPARATUS AND PROJECTION CONTROL METHOD

(75) Inventor: Kiyoshi Oda, Hino (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 831 days.

(21) Appl. No.: 13/600,737

(22) Filed: Aug. 31, 2012

(65) Prior Publication Data

US 2013/0057661 A1 Mar. 7, 2013

(30) Foreign Application Priority Data

Sep. 5, 2011 (JP) .................. 2011-192783

(51) Int. Cl.
| | |
|---|---|
| *G03B 21/00* | (2006.01) |
| *H04N 9/69* | (2006.01) |
| *G02B 26/00* | (2006.01) |
| *H04N 9/31* | (2006.01) |
| *H04N 13/04* | (2006.01) |
| *G03B 21/20* | (2006.01) |
| *G03B 35/24* | (2006.01) |
| *G09G 3/00* | (2006.01) |

(52) U.S. Cl.
CPC ................ *H04N 9/69* (2013.01); *G02B 26/008* (2013.01); *G03B 21/204* (2013.01); *G03B 35/24* (2013.01); *G09G 3/001* (2013.01); *G09G 3/003* (2013.01); *H04N 9/3155* (2013.01); *H04N 9/3182* (2013.01); *H04N 13/0422* (2013.01); *H04N 13/0438* (2013.01); *H04N 13/0459* (2013.01); *H04N 13/0497* (2013.01)

(58) Field of Classification Search
CPC ..... H04N 9/69; H04N 9/3155; H04N 9/3182; H04N 13/0434; H04N 13/0438; H04N 13/0459; H04N 13/0497
USPC ............... 353/7, 30, 31, 38, 85, 94, 101, 102; 348/743–747; 345/88, 690–692
See application file for complete search history.

(56) References Cited

U.S. PATENT DOCUMENTS

| | | | | |
|---|---|---|---|---|
| 6,990,234 | B2 * | 1/2006 | Kanai | .......................... 382/167 |
| 8,403,492 | B2 * | 3/2013 | Shibasaki | ............ H04N 9/3161 353/102 |
| 2003/0020879 | A1 * | 1/2003 | Sonehara | .......................... 353/7 |
| 2004/0057632 | A1 * | 3/2004 | Gindele | ........................ 382/274 |
| 2008/0018807 | A1 * | 1/2008 | Someya et al. | ................ 348/742 |
| 2010/0238412 | A1 * | 9/2010 | Kurosaki | ............ G03B 21/204 353/31 |
| 2011/0109657 | A1 * | 5/2011 | Ogita | ............................ 345/690 |
| 2011/0199580 | A1 * | 8/2011 | Hirata et al. | .................... 353/31 |

FOREIGN PATENT DOCUMENTS

JP 2007-536576 12/2007

* cited by examiner

*Primary Examiner* — Sultan Chowdhury
(74) *Attorney, Agent, or Firm* — Holtz, Holtz & Volek PC

(57) ABSTRACT

In a projection apparatus, a processor performs a light-source controlling process of simultaneously driving the semiconductor light-emitting elements included in the light source unit and of generating a sync signal for use in projecting a stereoscopic image, and a gradation controlling process of correcting gradations ranging from zero gradation to the gradation according to the luminance level of the sync signal, to a specific gradation, when the projecting unit forms an optical image of a color complimentary to the color of the sync signal generated by the light-source controlling unit.

9 Claims, 4 Drawing Sheets

PROJECTION APPARATUS AND PROJECTION CONTROL METHOD

CROSS-REFERENCE TO RELATED APPLICATIONS

This application is based upon and claims the benefit of priority from prior Japanese Patent Application No. 2011-192783, filed Sep. 5, 2011, the entire contents of which are incorporated herein by reference.

BACKGROUND OF THE INVENTION

1. Field of the Invention

The present invention relates to a projection apparatus and a projection control method, which fit for use as, for example, a data projector capable of projecting stereoscopic images.

2. Description of the Related Art

Hitherto, projectors of the Digital Light Processing (DLP) (trademark) type have been commercialized. In recent years, various techniques have been devised, which enable the projectors of the DLP type to project stereoscopic images (refer to, for example, Jpn. Pat. Appln. KOKAI Publication No. 2007-536576.)

To project a stereoscopic image with a projection using liquid-crystal shutter eyeglasses of ordinary type, sync pulses of much higher luminance than the projected image must be inserted in the left-eye and right-eye video signals, respectively, when projecting the image, so that the light-receiving elements at the liquid-crystal shutter eyeglasses may the sync signals, respectively, because of the difference in luminance level, when the left-eye image is switched to the right-eye image, or vice versa.

In any DLP projector that has color wheel having a plurality of color filters arranged along the circumference and a white light source such as high-pressure mercury lamp, the sync pulses are transmitted at the time the light beams pass the transparent white (W) filter.

In recent years, projectors have been put on the market, each projector using light-emitting diodes (LEDs) or laser diodes (LD, or semiconductor lasers) in place of the white light source.

In the projector of this type, each semiconductor light-emitting element basically emits a beam of one color only. Hence, a plurality of semiconductor light-emitting elements are driven in time-division, performing field-sequential light emission to display a color image.

Therefore, in any projector using various types of semiconductor light-emitting elements, at least two types are driven at the same time to generate a sync pulse obviously different in luminance from the sync pulse for any other field for which the elements of one type are driven.

In a projector having two semiconductor light-emitting elements, one being an LD capable of generating blue or green light by using a color wheel, and the other being a red-emitting LED, the LD emits green light of higher luminance than blue light it can emit. Hence, the LD and the LED are simultaneously driven, emitting a green light beam and a red light beam at the same time, generating a sync pulse for yellow, i.e., mixture of green and red, thereby to control the timing of switching the stereoscopic images.

In this case, the yellow light for the sync pulse influences the viewer's visual perception, making the viewer perceive any black part as yellowish, in an image that is dark because of dark pictures projected continuously, though how much yellowish the black part appears differs from viewer to viewer. Consequently, the dark image looks very unnatural in some cases.

BRIEF SUMMARY OF THE INVENTION

Accordingly, it is an object of the invention to provide a projection apparatus and a projection control method, capable of projecting stereoscopic images that appear natural to a viewer.

According to one aspect of the present invention, there is provided a projection apparatus comprising: a light source unit including a plurality of semiconductor light-emitting elements; an input unit configured to input video signal; a projecting unit configured to form an optical image according to the video signal input by the input unit and to project the optical image, using light coming from the light source unit; a light-source controlling unit configured to simultaneously drive the semiconductor light-emitting elements included in the light source unit and to generate a sync signal for use in projecting a stereoscopic image; and a gradation controlling unit configured to correct gradations ranging from zero gradation to the gradation according to the luminance level of the sync signal, to a specific gradation, when the projecting unit forms an optical image of a color complimentary to the color of the sync signal generated by the light-source controlling unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Hereinafter, an embodiment of a case where the present invention is applied to a DLP (registered trademark) data projector will be described with reference to the drawings.

Figure 1:
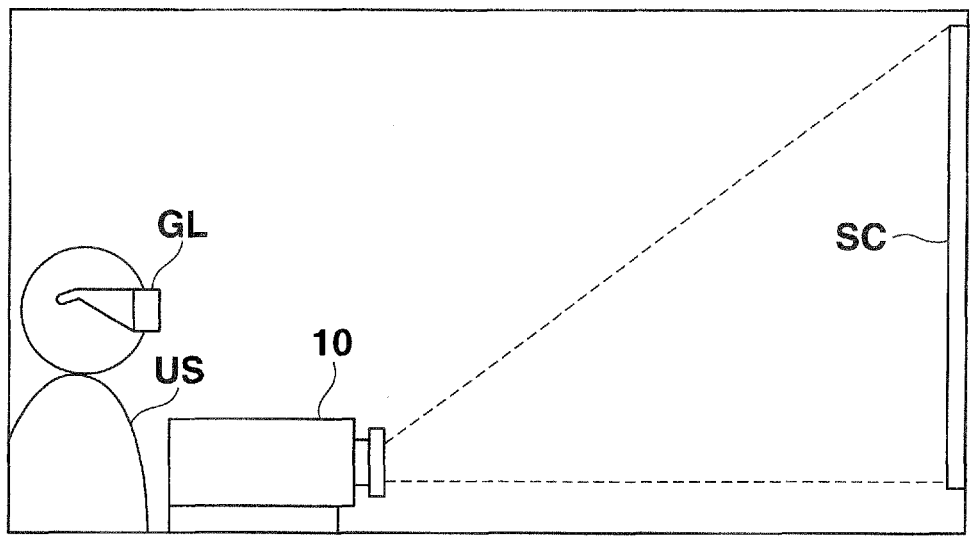
FIG. 1 is a diagram showing an environment in which a data projector according to one embodiment of the invention.

FIG. 1 is a diagram showing an environment in which the data projector 10 according to the embodiment projects images. As shown in FIG. 1, the data projector 10 projects an image onto a screen SC, and a user US wearing a pair of 3D liquid-crystal eyeglasses GL see the image projected onto the screen SC.

Figure 2:
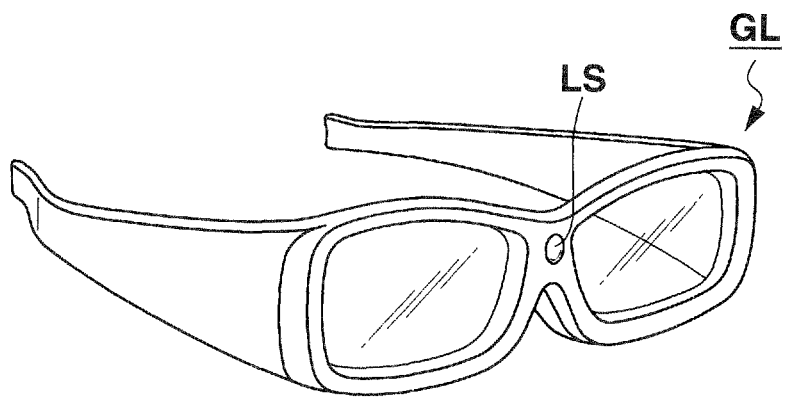
FIG. 2 is a perspective view, showing the outer appearance of a pair of 3D liquid-crystal eyeglasses according to the embodiment.

FIG. 2 is a perspective view, showing the outer appearance of the 3D liquid-crystal eyeglasses GL. The eyeglasses GL are over-glasses, which the user may wear on top of the other eyeglasses he or she is wearing. On the bridge connecting the glasses CL, a light-receiving sensor LS is provided. The light-receiving sensor LS detects the changes in the luminance at the screen SC if it is directed to the screen SC. In synchronism with the sync signal superimposed on the image projected onto the screen Sc and received at the light-receiving sensor LS, the left-eye lens and the right-eye lens are alternately shut and open, enabling the user US to see a stereoscopic image.

The 3D liquid-crystal eyeglasses GL is similar in configuration to the existing liquid-crystal shutter glasses of the frame sequential system. Therefore, the internal circuit configuration, the functions of the circuits, etc., will not be described herein.

Figure 3:
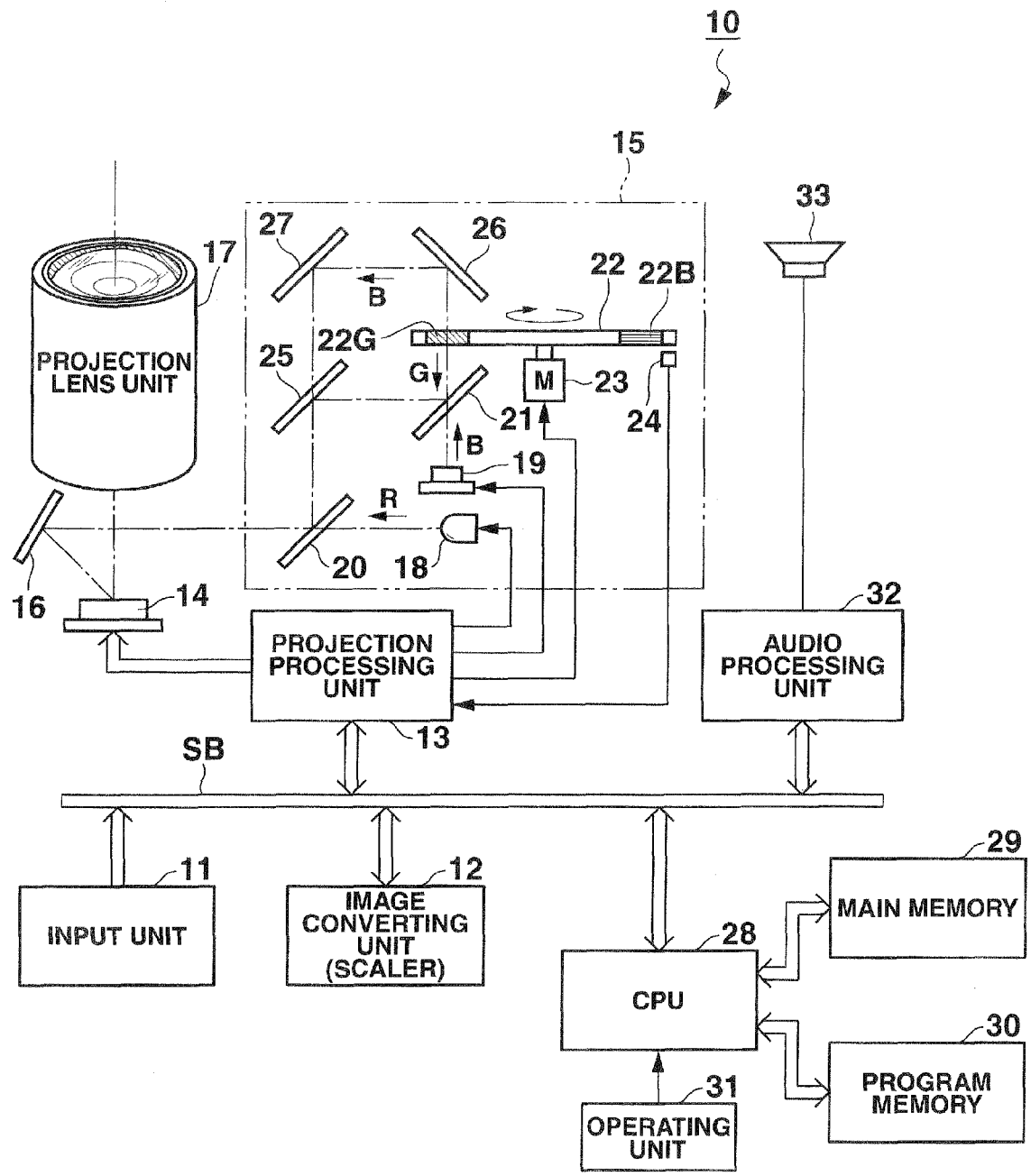
FIG. 3 is a block diagram schematically showing the function circuits incorporated in the data projector according to the embodiment.

With reference to FIG. 3, the functional circuits incorporated in the data projector 10 will be described with reference to FIG. 3.

The input unit 11 includes a video input terminal of, for example, pin-jack (RCA) type, an RGB input terminal of D-sub 15 type, and a High-Definition Multimedia Interface (HDMI) terminal. The video signals of various standards input to the input unit 11 are converted, if necessary, to digital signals in the input unit 11. The resultant digital signals are supplied to the image converting unit 12 through the system bus SB.

The image converting unit 12, also called a scaler, converts the input video data to video data of a format fit for image projection and performs gamma correction on the video data of this format, correcting the gradation of each color to the value that accords with the color characteristic of the data projector 10. The video data, thus gamma-corrected, is supplied to the projection processing unit 13.

In accordance with the video data supplied from the image converting unit 12, the projection processing unit 13 performs high-speed time division drive on the micromirror element 14, on the basis of the product of the frame rate (for example, 120 fps), the color-component divider and the number of display gradations. So driven, the micromirror element 14 displays an image.

The micromirror element 14 has a plurality of micromirrors arranged in a two-dimensional array (for example, wide extended graphic array (WXGA), having 1280 pixels (in the horizontal direction)×800 pixels (in the vertical direction). Each micromirror is tilted on and off at high speed, independently of any other, reflecting a light beam. The light beams reflected by the micromirrors form an optical image.

In the meantime, the light source unit 15 emits three primary-color beams, i.e., R, G and B beams, in time-division, repeatedly one after another. The primary-color beams are totally reflected at the mirror 16 and applied to the micromirror element 14.

The light beams reflected by the micromirror element 14 forms an optical image. The optical image so formed is projected onto the screen SC through the projection lens unit 17.

The light source unit 15 has a red-emitting diode (LED) 18 (hereinafter called an R-LED), a blue-emitting diode (LED) 19 (hereinafter called a B-LED).

The red beam emitted from the R-LED 18 passes through a dichroic mirror 20, reaching the mirror 16.

The blue laser beam emitted from the B-LD 19 passes through a dichroic mirror 21 and is applied to the circumferential surface of the color wheel 22. The color wheel 22 is rotated by a wheel motor (M) 23. A phosphor layer 22G and a diffusion layer 22B are provided on the circumferential surface of the color wheel 22, to which the blue laser beam is applied. A reflector (not shown) is provided on the surface of the color wheel 22, other than the surface having the phosphor layer 22G. Thus, the reflector overlaps the phosphor layer 22O. The diffusion layer 22B is a transmitting member like a polished glass plate.

On a part of the circumferential surface of the color wheel 22, a wheel marker (not shown) is provided to ensure rotational synchronization of the color wheel 22. A marker sensor 24 is provided at a position where the wheel marker passes, to detect the rotational synchronization of the color wheel 22.

In this embodiment, the color wheel 22 rotates exactly once, or through 360, in synchronism with one frame of any color image, and the wheel marker passes a position near the marker sensor 24 at the start timing of one marker. On detecting the wheel marker, the marker sensor 24 sends a detection output to the projection processing unit 13. On receiving the detection output, the projection processing unit 13 detects the rotating state of the color wheel 22.

The blue laser beam emitted from the B-LD 19 is applied to the phosphor layer 22G provided on the circumferential surface of the color heel 22. As a result, a green light beam is generated as reflection light. The green light beam is reflected first by the dichroic mirror 21, then by a dichroic mirror 25, and further by the dichroic mirror 20, and is thereby guided to the mirror 16.

If a blue laser beam emitted from the B-LD 19 is applied to the diffusion layer 22B provided on the color wheel 22, it passes through the diffusion layer 22B, while diffusing therein. The blue light beam emerging from the diffusion layer 22B is reflected by mirrors 26 and 27 facing each other across the color wheel 22, by an angle of 90° at each of these mirrors 26 and 27. The blue light beam then passes through the dichotic mirror 25, is reflected by the dichroic mirror 20, and is guided to the mirror 16.

Thus, the dichroic mirror 20 allows the passage of the red light beam and reflects the blue light beam and the green light beam. Both the dichroic mirror 21 and the dichroic mirror 25 allow the passage of the blue light beam and reflect the green light beam.

The projection processing unit 13 causes the micromirror element 14 to form an optical image, the R-LED 18 and B-LD 19 to emit light beams, and the marker sensor 24 to detect the rotational timing of the color wheel 22, under the control of the CPU 28, as will be explained later.

All circuits described above are controlled by the CPU 28. The CPU 28 is connected directly to the main memory 29 and the program memory 30. The main memory 29 is constituted by, for example, an SRAM, and functions as work memory for the CPU 28. The program memory 30 is constituted by an electrically programmable, nonvolatile memory, and stores operation programs, various standard data, etc., that the CPU 28 may execute. The CPU 28 uses the main memory 29 and program memory 30 to control the other components of the data projector 10.

The CPU 28 performs various operations to project images, in accordance with the instructions the user makes by operating the keys of the operating unit 31.

The operating unit 31 includes a key operating unit and a laser-beam receiving unit, both provided on the main unit of the data projector 10. The laser-beam receiving unit is configured to receive an infrared light beam coming from a remote controller (not shown). The operating unit 31 can therefore outputs the key-operation signals generated as the user operates the key operating unit of the operating unit 31 or the keys provided on the remote controller, directly to the CPU 28.

The CPU 28 is further connected by the system bus SB to an audio processing unit 32. The audio processing unit 32 includes a sound-source circuit such as a PCM sound source, and is configured to convert the audio data received in preparation for image projection, to drive the speaker 33 and causing the same to generate sound or a beep as needed.

How the embodiment described above operates will be explained below.

It should be recalled that all operations to be described below are performed after the CPU 28 extends, in the main memory, the operation programs, the various standard data, etc., that the CPU have read from the program memory 30.

For simplicity of explanation, it is assumed that one frame of the left-eye color image and one frame of the right-eye color image are projected, and that one frame is composed of a sync field Sync, a blue (B) field, a red (B) field and a green (G) field, totaling four fields.

Figure 4:
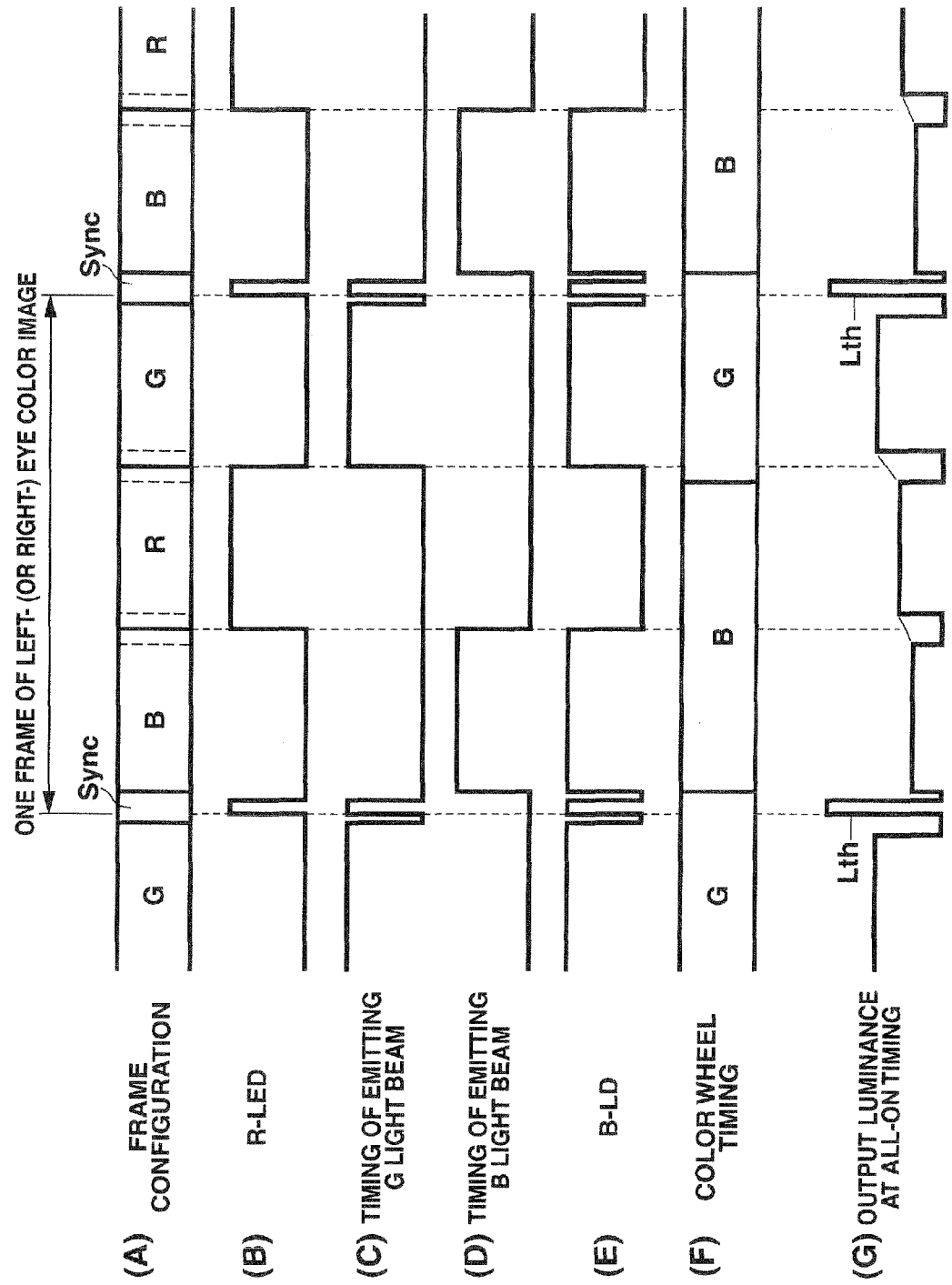
FIG. 4 is a timing chart showing how the light sources are driven to project a 3D image from the data projector according to the embodiment.

FIG. 4 shows the configuration of one color-image frame for the left eye or right eye, the light-emission timing for each field, and the level of the input to the light-receiving sensor LS of the 3D liquid-crystal eyeglasses GL.

As can be seen from (A) in FIG. 4, one frame for the color image for the left (or right) eye is composed of a sync field Sync, an image field B for blue light, an image field R for red light, and an image field G for green light.

A frame for the color image for the left eye and a frame for the color image for the right eye constitute one frame of a stereoscopic image. To project a stereoscopic image, color image frames for the left eye and color image frames for the right eye are alternately projected.

At (A) in FIG. 4, two periods indicated by broken lines, one between a B-field and an R-field, and the other between the R-field and a G-field following the R-field, are used as spoke periods in the DLP (trademark) data projector that uses a color wheel of ordinary type. Either spoke period is used to adjust any half-tone color.

During the Sync field, a red light beam and a green light beam are emitted at the same time, obtaining a yellow light, beam as a mixed color beam, thereby generating a sync pulse. To this end, the R-LED 18 is driven, emitting a red light beam, in both the Sync field and the P-field.

As shown at (C) in FIG. 4, the time at which to emit a green light beam is the Sync field period and G-field period. As shown at (D) in FIG. 4, the time at which to emit a blue light beam is only the G-field period.

That is, as shown at (F) in FIG. 4, the B-LD 19 is driven to emit a light beam in the Sync field period, B-field period and G-field period, but not in the R-field period.

Further, the rotational phase of the color wheel 22 is controlled so that the phosphor layer 22G may be positioned on the laser beam emitted from the B-LD 19 during the Sync field period and G-field period, and the diffusion layer 22B may be positioned on the laser beam emitted from the B-LD 19 during the B-field period.

The R-LED 18 and B-LD 19 are driven and the color wheel 22 are rotated at the timing specified above. As a result, all pixels of the micromirror element 14 for displaying an image are turned on, whereby the input light, is totally reflected toward the projection lens unit 17. The luminance acquired at the light-receiving sensor LS of the 3D liquid-crystal eyeglasses CL the user is wearing is shown at (G) in FIG. 4.

In the Sync field, two types of light-emitting elements, i.e., R-LED 18 and B-SD 19, emit light at the same time. The luminance level is much higher at the receiving side than in any other image projecting field, though the duration of the sync pulse is short.

In view of this, a luminance threshold value Lth is preset for the Sync field, which can never be attained for any other image projection fields. If luminance higher than the luminance threshold value Lth is detected at the 3D liquid-crystal eyeglasses GL, the liquid-crystal shutters at the left- and right-eye lens surfaces (not shown) can be alternately turned on to switch the left-eye image and the right-eye image, from one to the other, at appropriate synchronization timing.

Thus, all pixels of the micromirror element 14 for displaying a stereoscopic: image are turned on in the Sync field to project the stereoscopic image. In other words, the micromirror element 14 reflects the input light at entire surface, toward the projection lens unit 17, projecting the image onto the screen SC. The image switching can thereby be reliably accomplished at the 3D liquid-crystal eyeglasses GL.

In the B-field, R-field and G-field, the micromirror element 14 displays the optical images of the respective colors in accordance with the video signal input from the input unit 11. These optical images are then projected onto the screen SC.

To project an image entirely dark, for example, the mirrors for the respective pixels are driven in micromirror element 14 so that no reflected light may be applied to the projection lens unit 17 in the B-field, R-field and G-field.

In this case, no light is projected onto the screen SC in the B-field, R-field and G-field, though bright yellow image is projected onto the screen SC in the Sync field for so short a time that human eyes scarcely perceive it.

Nonetheless, the entire screen SC that should be all black may appear yellowish and thus conspicuous to some persons. That is, the black screen may appear somewhat colored, or unnatural.

This is why some of the gradation levels are "bottomed up" in this embodiment, while the image converting unit 12 is performing the gamma correction on the blue light beam to make the beam assume a color complement to the yellow light beam.

Figure 5:
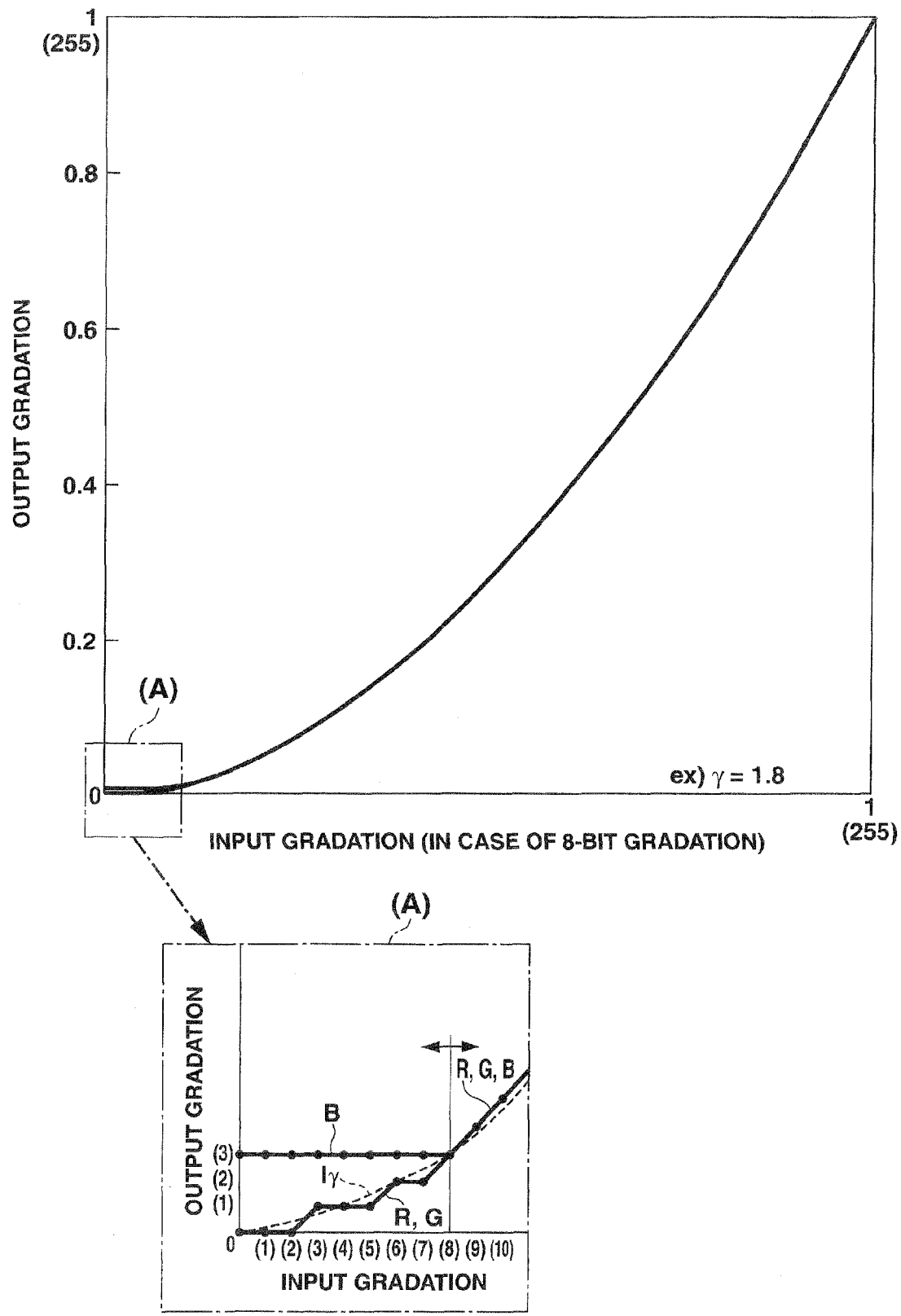
FIG. 5 is a diagram showing how a gamma correction is performed in the embodiment.

FIG. 5 is a diagram showing how the gamma correction is performed not only on the red and green light beams, but also on the red light beam. The correction coefficient γ applied in the case of FIG. 5 is 1.8 (γ=1.8). The correction coefficient may have any other value, nevertheless. The embodiment is based on the assumption that eight gradation bits are set to each pixel color, and that the gradation is corrected from zero gradation 0 (0) to full gradation 1 (255).

At (A) in FIG. 5, the part of the diagram, pertaining to the zero gradation, is magnified. At (A), broken-line curve Iγ is a γ curve ideal for the correction coefficient of 1. Red (R) and green (C) are subjected to gamma (γ) correction to acquire gradation values most approximate to curve Iγ. In contrast, blue (B) is subjected to gamma correction to acquire one gradation value of, for example, 3, for values of, for example, 0 to 8.

Hence, only the blue (B) component gamma-corrected is projected as blue beam of very low luminance even if the projected image is all black, defined by pixels all assume gradation values of zero before being gamma-corrected. The blue component cancels out the yellow component (complimentary color) in the above-mentioned Sync field, whereby a very faint gray beam is projected.

As a result, the yellow light beam, i.e., colored beam projected in the Sync field to synchronize a dark stereoscopic image at the time of projection, is replaced by the gray light beam, providing an image appearing not so unnatural to the user who view the image.

To correct the gradation for the blue component, i.e., color component complimentary to yellow, to a specific value within a particular range, the gradation range should be selected to correspond to the energy of the sync pulse output in the Sync field, so that the blue component may cancels out the yellow component, thereby changing the blue component to a gray component.

The gamma correction is utilized to achieve an object different from the object inherent to the gamma correction (i.e., to project the image in the color balance that accords with the system). Nonetheless, the gamma correction can lower the luminance level of the yellow component output in the Sync field to project an ordinary bright image, and the luminance level scarcely influence the quality of the projected image.

Thus, this embodiment changes the blue component to a non-color component only if a dark image, almost all-black image, is projected, preventing the yellow component from appearing conspicuous in the image.

As has been described in detail, the embodiment can project stereoscopic images that do not appear unnatural to the user who views the images projected.

In the embodiment, the image converting unit 12 performs the gamma correction on only the color component complimentary to the color component for the sync pulse, for example, the blue component if the color component for the sync pulse is yellow component, because of the configuration of the data projector 10. This gamma correction can be performed along with the ordinary processes in the data projector 10, limiting the load on the projection 10 to a minimum, without using additional components and, hence, without making the configuration complex.

In the embodiment described above, the light source unit 15 has an R-LED 18 and a B-LD 19, which emit a red light beam and a blue laser beam, respectively, as semiconductor light-source elements. Nonetheless, the invention is not limited to the embodiment. Rather, other types of semiconductor light-source elements may be used, and the elements used may emit light beams of other colors.

The present invention is not limited to the embodiments described above. The components of any embodiment can be modified in various manners in reducing the invention to practice, without departing from the spirit or scope of the invention. Further, the components of any embodiment described above may be combined, if necessary, in various ways to make different inventions. For example, the functions of the embodiment described above may be combined in any desired fashion. The embodiment described above includes various phases of the invention. The components disclosed herein may be combined as needed to make various inventions. For example, even if some components of the embodiment described above are not used, the resulting configuration can be considered as the invention so long as it achieves advantages described above.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A projection apparatus comprising:
    a light source unit including a plurality of semiconductor light-emitting elements;
    an input unit configured to input a video signal;
    a projecting unit configured to form an optical image according to the video signal input by the input unit and to project the optical image, using light from the light source unit;
    a light-source controlling unit configured to simultaneously drive the semiconductor light-emitting elements included in the light source unit and to generate a sync signal for use in projecting a stereoscopic image; and
    a gradation controlling unit configured to correct gradations ranging from zero gradation to a gradation according to a luminance level of the sync signal, to a specific gradation value according to the sync signal, with respect to a color complimentary to a color of the sync signal.

2. The projection apparatus according to claim 1, wherein the gradation controlling unit corrects the gradations during a part of gamma correction performed on output gradation with respect to input gradation.

3. The projection apparatus according to claim 1, wherein the color of the sync signal is yellow, and the complimentary color is blue.

4. The projection apparatus according to claim 3, wherein the light source unit includes a light-emitting diode configured to emit a red light beam and a semiconductor laser configured to emit a blue laser beam.

5. The projection apparatus according to claim 4, wherein:
    the projecting unit includes a color wheel having a phosphor layer and a diffusion layer, and a micromirror element; and
    the semiconductor laser is operable to apply the blue laser beam to the phosphor layer so as to excite the phosphor layer and cause the phosphor layer to generate a green light beam, and the micromirror element then reflects the blue laser beam, the red light beam and the green light beam, thereby forming an optical image.

6. A display apparatus comprising:
    an input unit configured to input a video signal;
    a display unit configured to display an image according to the video signal input by the input unit;
    a display controlling unit configured to transmit a sync signal to project for use in projecting a stereoscopic image; and
    a gradation controlling unit configured to correct gradations ranging from zero gradation to a gradation according to a luminance level of the sync signal, to a specific gradation value according to the sync signal, with respect to a color complimentary to a color of the sync signal.

7. The display apparatus according to claim 6, wherein the gradation controlling unit corrects the gradations during a part of gamma correction performed on output gradation with respect to input gradation.

8. The display apparatus according to claim 6, wherein the color of the sync signal is yellow, and the complimentary color is blue.

9. A projection control method for use in an apparatus comprising a light source unit including a plurality of semiconductor light-emitting elements, an input unit configured to input a video signal, and a projecting unit configured to form an optical image according to the video signal input by the input unit and to project the optical image, using light from the light source unit, the method comprising:
    simultaneously driving the semiconductor light-emitting elements included in the light source unit and generating a sync signal for use in projecting a stereoscopic image; and correcting gradations ranging zero gradation to a gradation according to a luminance level of the sync signal, to a specific gradation value according to the sync signal, with respect to a color complimentary to a color of the generated sync signal.

\* \* \* \* \*

UNITED STATES PATENT AND TRADEMARK OFFICE
CERTIFICATE OF CORRECTION

PATENT NO. : 9,294,749 B2
APPLICATION NO. : 13/600737
DATED : March 22, 2016
INVENTOR(S) : Kiyoshi Oda Page 1 of 1

It is certified that error appears in the above-identified patent and that said Letters Patent is hereby corrected as shown below:

In the claims,
Column 8, line 42, after "signal" delete "to project".

Signed and Sealed this
Twenty-third Day of August, 2016

Michelle K. Lee
*Director of the United States Patent and Trademark Office*